Nov. 5, 1935.   J. F. ROBB   2,020,161
TRAILER
Original Filed July 6, 1933   3 Sheets-Sheet 1
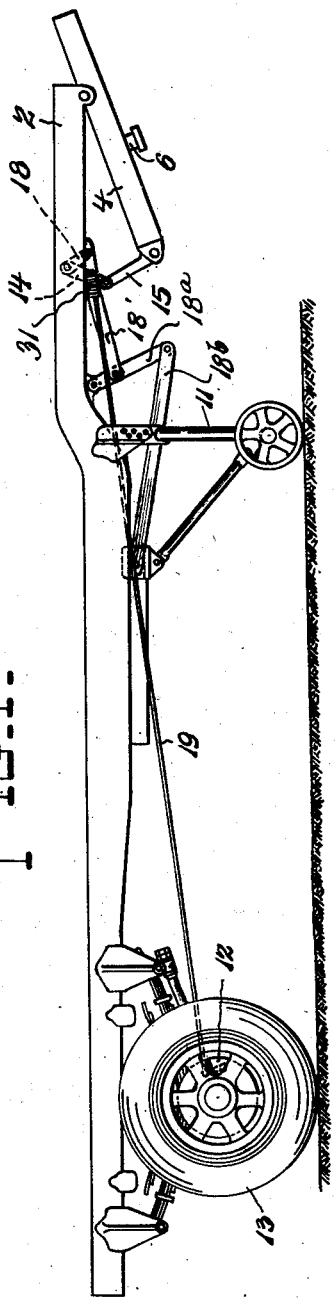
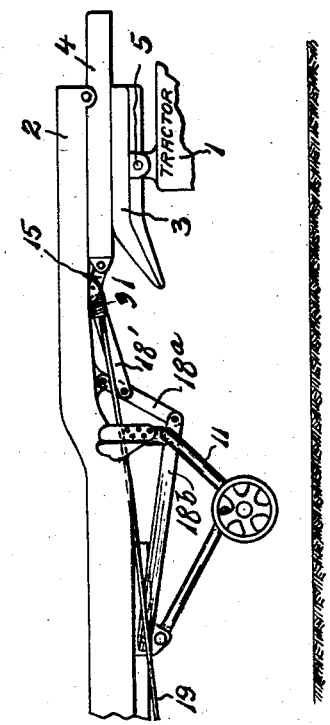
Inventor
JOHN F. ROBB.
By Robb & Robb
Attorneys

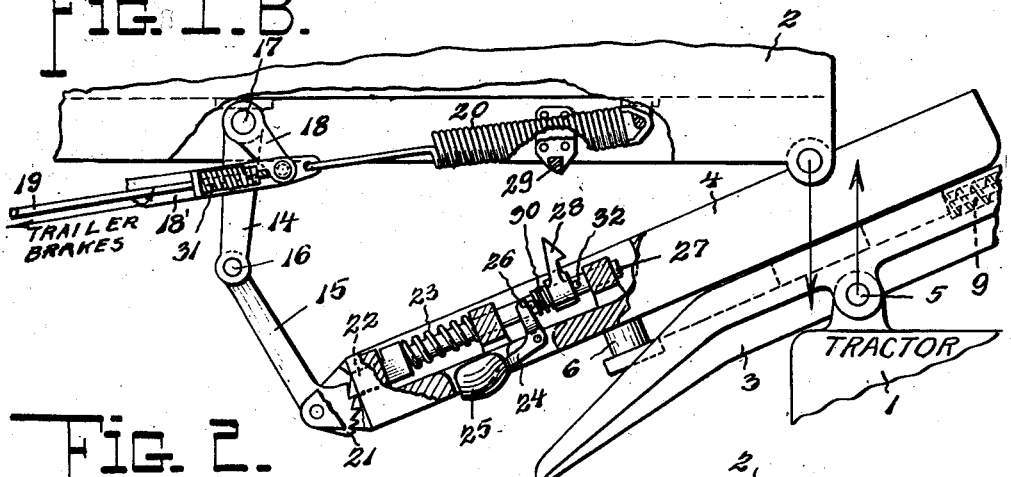
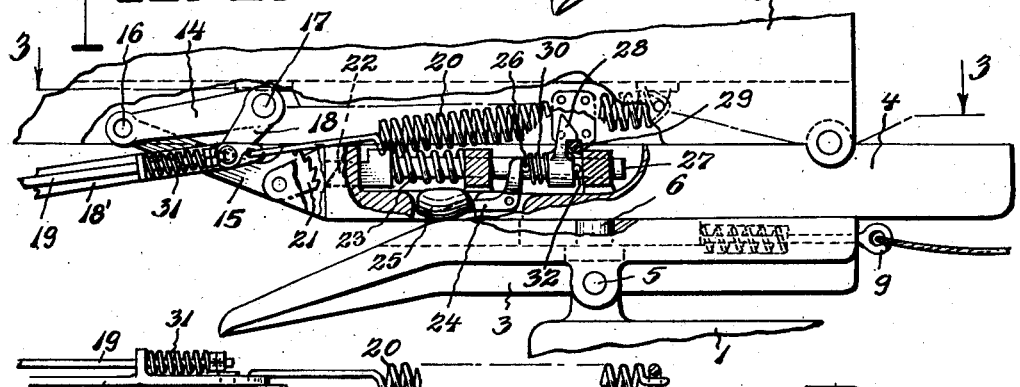
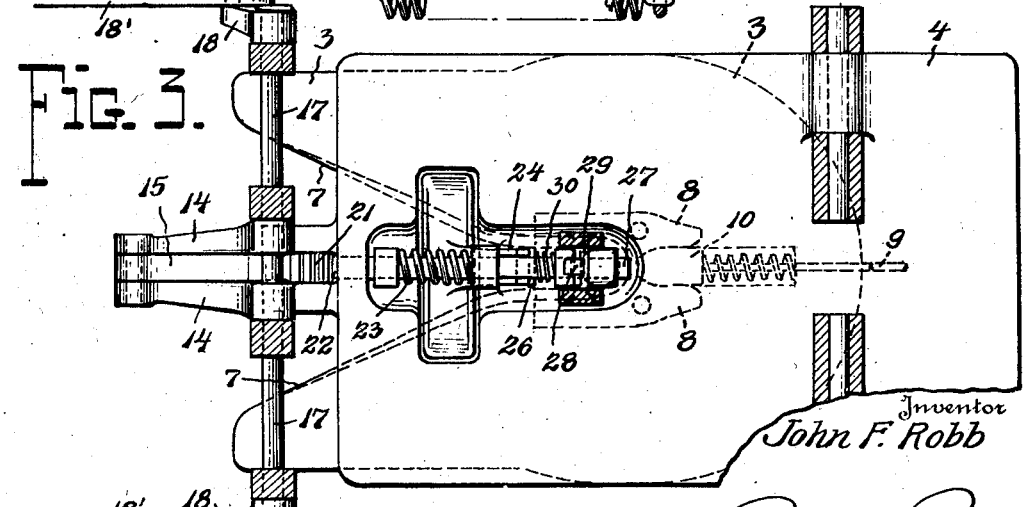

Nov. 5, 1935.  J. F. ROBB  2,020,161
TRAILER
Original Filed July 6, 1933  3 Sheets-Sheet 3
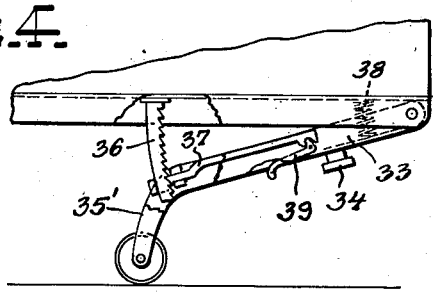
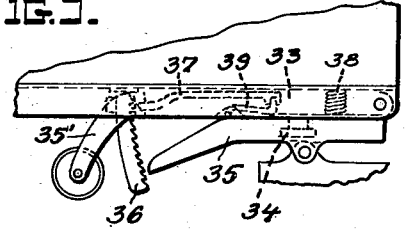
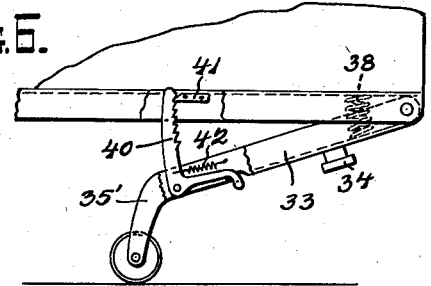
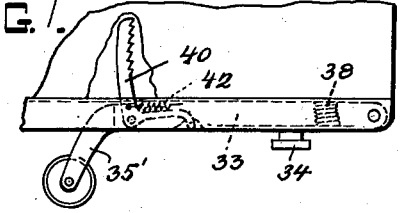
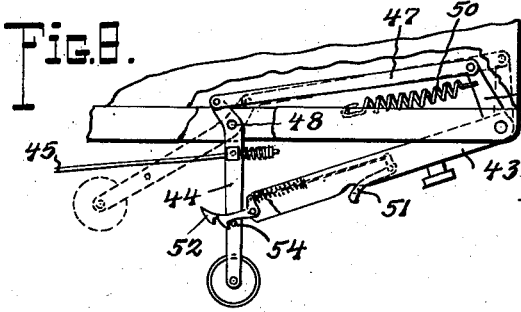
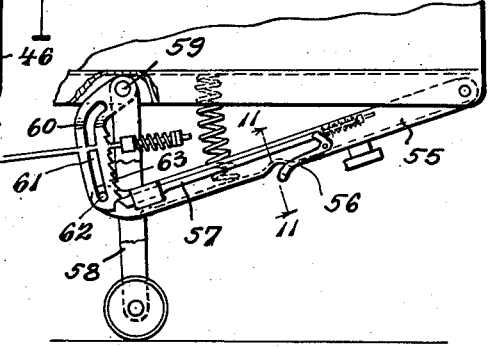
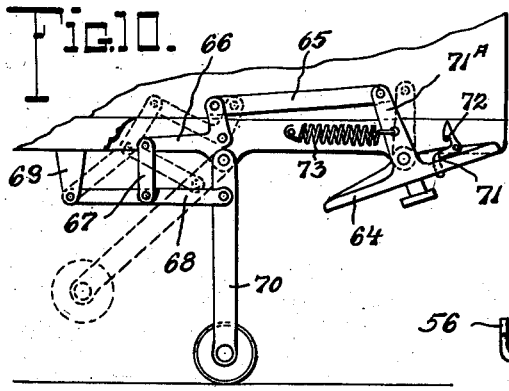
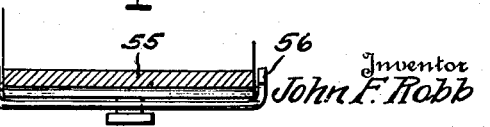
Inventor
John F. Robb
By Robb & Robb
Attorneys Patented Nov. 5, 1935

2,020,161

UNITED STATES PATENT OFFICE 2,020,161

TRAILER

John F. Robb, Cleveland Heights, Ohio, assignor to The Highway Trailer Company, Edgerton, Wis., a corporation Application July 6, 1933, Serial No. 679,233
Renewed September 20, 1935

16 Claims. (Cl. 280—33.1)

The invention herein claimed appertains to the art of tractor-trailer combination vehicles, and deals with certain problems of modern desirable use of such vehicles.

It is known to those versed in the art that certain tractor-trailer combinations of the class referred to are known as full-automatic machines. In these machines, the front end of the trailer is equipped with a wheeled support of some kind, movable to an upper inoperative position when the trailer is attached to the tractor and movable to a downward, supporting, operative position when the tractor is uncoupled from the trailer.

Likewise, brake mechanism is employed to enable the application of brakes to the main rear wheels of the trailer, when it is uncoupled from the tractor, for obvious reasons.

The present invention has for its primary object, the provision of such supporting and/or brake mechanism on the trailer, designed to be operated automatically in conjunction with a construction of trailer fifth wheel movably mounted on the trailer, in a pivotal manner, independently of the supporting and/or brake devices.

Other objects of the invention are to simplify the mechanical devices for obtaining cooperation between the tractor fifth wheel and the trailer fifth wheel devices, such that the automatic actions of these parts are subserved to accomplish the results of full-automatic tractor-trailer combination vehicles in a manner which will be set forth hereinafter in relation to a number of different modifications of the invention.

In the accompanying drawings:—

Figure 1 is a side elevation of a trailer vehicle somewhat diagrammatically illustrated with one form of my invention applied thereto.

Figure 1A is a partial side elevation of the trailer shown in Figure 1 and illustrates the same in coupled relationship with the lower fifth wheel of a tractor.

Figure 1B is an enlarged side elevation in partial sectional view of the tractor fifth wheel, trailer fifth wheel and support and brake operating parts, as shown in Figures 1 and 1A.

Figure 2 is a view similar to Figure 1B but illustrating the tractor and trailer fifth wheels coupled together.

Figure 3 is a partial plan view and partial sectional view of the parts shown in Figures 1B and 2.

Figure 4 illustrates a modification of the invention, wherein the trailer support is integral with the trailer fifth wheel.

Figure 5 is a view similar to Figure 4, but showing the trailer support elevated to its inoperative position, allowing clearance from the ground.

Figures 6 and 7 are views similar to Figures 4 and 5, showing a modification of the constructions therein.

Figure 8 is a view similar to Figure 4, but showing a modified embodiment, wherein the support is mounted on the trailer independently of the fifth wheel.

Figures 9 and 10 are views similar to Figure 8 illustrating modifications wherein the supports attached to the trailer are independent of the fifth wheel.

Figure 11 is a cross sectional view of the construction shown in the cross sectional view on line 11—11 of Figure 9.

This specification being addressed to those skilled in the art, it is unnecessary to describe in detail the tractor and trailer vehicles, such as contemplated to be used for the present invention. For purposes hereof, I designates the tractor vehicle, and 2 the trailer vehicle. The tractor vehicle is equipped with a fifth wheel 3 of a known type, such as disclosed in the patent of Martin and Farr, No. 1,412,025, and the patent of Hartwick, No. 1,351,245, heretofore issued.

On the trailer 2 is pivotally mounted the fifth wheel 4. This fifth wheel is the upper fifth wheel of the fifth wheel unit comprising the parts 3 and 4, the part 3 being pivoted at 5 to the tractor. On the fifth wheel 4 is carried the king pin 6 adapted to enter the split portion 7 of the lower fifth wheel 3, see Figure 3, and interengaged with latches or suitable locking means carried by the fifth wheel 3, which automatically cooperate to lock the king pin 6 within the king pin socket of the fifth wheel 3. Said locking means may comprise the latches 8, see Figure 3, and manual means 9 controlling a spring actuated lock member 10, the manual means operable to release the latch or locking parts 8, and thus permit the release of the king pin 6 when it is desired to uncouple the trailer from the tractor. Any conventional type of locking means 8 and hand controlling means 9 and 10 may be resorted to as this is not material to my invention so far as specific forms of such means may be concerned. The rear end of the fifth wheel 4 is connected to the support 11 for the trailer 2, and to the brakes 12 for the rear wheels 13 of the trailer 2 by means now to be described.

Intermediate the rear end of the fifth wheel 4 and the frame or chassis of the trailer 2, is an operating and locking connection which includes upper lever arms 14 and lower sector links 15, the two sets of parts pivotally connected at 16. The lever arms 14 are carried by rock shafts 17 on the trailer, equipped with short arms 18 connected in any suitable manner by bars 18' to the support 11 through the intermediate lever 18ª and link 18ᵇ to raise and lower said support and also connected by brake rods 19 with the brakes 12 of the trailer for applying and releasing said brakes. Normally, a heavy spring 20 connected to the trailer frame and to the rear ends of the support actuating bars 18', tends to pull forwardly upon said bars and thus rock the parts 18, 17, 14, 18ª, 18ᵇ, and 15 to a position such as shown in Figure 1, namely, with the upper fifth wheel 4 tilted to its downward position ready for coupling, or what may be characterized as its uncoupled position with relation to the lower fifth wheel 3. On the link members 15 are formed toothed sectors 21 engageable with dogs or latches 22 on the fifth wheel 4, said dogs or latches being actuated in the direction of engagement with the sectors 21 by springs 23. Also, carried by the fifth wheel 4 is a trip lever 24 having an actuating head 25, the purpose of which will appear hereinafter, said trip lever cooperating with projections 26 on the slide bar 27 carried by the fifth wheel 4, which slide bar likewise supports the latch 28 for cooperation with the stationary latch member 29 on the trailer frame 2, when the fifth wheel 4 is in its horizontal position.

A spring 30 tends to yieldingly engage the latch 28 to hold same in cooperation with the latch member 29. With the above in view, the operation of the parts may be described in conjunction with Figures 1B and 2 of the drawings.

Let us assume that the illustration of Figure 1 shows the tractor fifth wheel 3 being moved rearwardly into engagement with the trailer fifth wheel 4, the trailer having its brakes applied, and having its support 11 lowered and actually supporting the front end of the trailer preliminary to the above operation. As the fifth wheel 3 slides rearwardly into engagement with the fifth wheel 4, when fully together, the king pin 6 will be automatically locked or coupled to the fifth wheel 3 in the usual manner. Just as the final coupling or locking of these parts takes place, the relatively wide actuating head 25 of the trip lever 24 is engaged by the rearmost portion of the flat plane of the fifth wheel 3, the lever 24 thus tilted and withdrawing the latches 22 from engagement with the sectors 21 of the link members 15. The foregoing renders the upper fifth wheel 4 tiltable upwardly to a traveling horizontal position and the tilting operation is utilized to move the support 11 upwards to its inoperative position, and to pull the spring 20 under expansive counter-tension to release the brakes by relieving the pull on the brake rods 19. The foregoing is accomplished, of course, by the rocking action of the parts 14, 17, 18, 18ª, and 18ᵇ.

Brake rods 19 are equipped with the small actuating springs 31 to cause application of the brakes before the fifth wheel 4 is fully tilted downwards, as well as to accommodate for wear. It is desirable that the brakes be applied as promptly as possible to the rear wheels of the trailer in the uncoupling operations.

Assuming now that the parts are in the position of Figure 2, it will be evident that the fifth wheel 4 has become locked in its horizontal or up-raised position, by means of the engagement of the movable latch part 28 cooperating with the stationary latch member 29. The foregoing is a desirable adjustment and control of the parts for the traveling operation of the tractor-trailer vehicle combination, for obvious reasons. Moreover, the pressure of the lower fifth wheel 3 against the actuating head 25 of the trip lever 24, ensures a position of the slide 27 such as will maintain the parts 28 and 29 in their engagement during traveling of the trailer behind the tractor.

The trailer having been conveyed to the place where it is to be loaded or unloaded, during which operation the operator of the tractor will take the latter to some other place for transportation of another trailer, uncoupling is performed as follows.

The operator manipulates the hand operating means 9 to release the locking devices 8 from the king pin 6. The driver of the tractor then moves his machine forward or away from the trailer. In this operation, the tractor fifth wheel rocks downwardly and rearwardly and the trailer fifth wheel 4 is similarly caused to rock when the latch member 28 is released from the latch member 29 because of the relieving of the pressure upwardly against the trip lever head 25, by the forward movement of the fifth wheel 3, removing said fifth wheel from contact with the head 25. This action is accomplished as to a detailed phase by the force of the spring 23, the power of which is such as to propel each associated latch 22 rearwardly when the pressure on the head 25 is relieved. Thus the spring 23 for the latch 22 by carrying the same rearwardly for engagement with the sectors 21 moves across pin 32 rearwardly, said cross pin abutting with the latch part 28 and causing same to move rearwardly to disengage it from the latch member 29, rendering the fifth wheel 4 free to rock downwards to its position of Figure 1B from the position of Figure 2.

It is to be understood that so far as the operativeness of my mechanism above described is concerned, it is equally useful for operation of brakes for the rear trailer supporting wheels, or for the operation of supports for the front end of the trailer, whether the above features are used alone, as well as when they are used in combination.

Modification of Figures 4 and 5

Passing to the construction of Figures 4 and 5, without referring to certain details that will be understood from the previous description, the trailer fifth wheel is designated 33, its king pin 34, and the tractor fifth wheel is designated 35. The trailer fifth wheel 33 has an integral downwardly extending supporting member 35', constituting the support for the trailer when uncoupled from the tractor. The trailer is equipped with ratchet bars 36 engageable by sliding lock bars 37 on the fifth wheel 33. Spring means 38 tend to force the fifth wheel 33 downwards to a supporting position as the tractor pulls away from the trailer. A trip lever 39 is adapted to be struck by the lower fifth wheel on the tractor as the tractor fifth wheel is backed into engagement with the king pin 34, and beneath the trailer, said lever 39 imparting sliding forward movement to the associated part 37, and thus releasing the fifth wheel 33, and its supporting member 35 to permit same to raise from the position of Figure 4 to the position of Figure 5.

Modification of Figures 6 and 7

In this construction much the same general principle of construction is employed, as in Figures 4 and 5 as to the fifth wheel device on the trailer. However, the locking means to hold the supporting member 35' down when the fifth wheel 33 is in the position of Figure 6, are somewhat different. They comprise the bell crank or angle ratchet lever 40 adapted to engage a stationary lock member 41 on the trailer frame and held in such engagement by spring means 42. The lower arm of the lever 40 is the trip arm engageable by the lower fifth wheel and acting equivalently to the lever 39 in Figures 4 and 5.

Modification of Figure 8

In this type of construction, the fifth wheel is designated 43. The support for the trailer is 44 and is pivoted to the trailer independently of the fifth wheel similar to the constructions of Figures 1 to 3. In this view, 45 denotes the brake actuating rod. The fifth wheel 43, moreover, is equipped with a rigid lever arm 46 connected by a link 47 to the upper end of the standard which forms a support 44, said standard being pivoted between its ends at 48, and normally a spring 50 tends to cause the support 44 to move downwardly from its dotted line position to its vertical position. As the tractor fifth wheel backs into engagement with the trailer fifth wheel 43, it will strike the trip lever 51 and pull upwards the pawl or latch 52 disengaging the latter from the pin 54, on the standard and thus permitting the support 44 to be raised as the weight of the trailer is transferred to the fifth wheel of the tractor.

On uncoupling the tractor from the trailer, spring 50 comes into play to shift the support 44 downwards through the linkage 47 until the dog 52 re-engages and locks the support down as self evident.

Modification of Figure 9

In Figure 9, the fifth wheel 55 of the trailer, has parts 56 and 57 somewhat like the parts 39 and 37, respectively, of Figure 4, but in this construction, the support 58 is pivoted to the trailer, and not integral with the fifth wheel. The support 58 is carried rigidly on a rod shaft 59, with which also is a rigid cam lever 60, formed with a curved slot 61 therein. On the rear end of the fifth wheel 55 is a pin 62 engaging in the slot 61. The lever 60 is likewise formed with a ratchet portion 63, engageable by the latch member 57. As the fifth wheel in the tractor-trailer coupling operation is released by actuation of the latch member 57, it raises, and the pin 61, while at first not elevating the support 58, finally reaches the upper curved portion of the slot 61, and then cams the lever 60 with abrupt movement such as will draw the support 58 rearwardly and upwardly to give a proper clearance from the ground when the tractor is attached to the trailer, ready to travel forward.

Modification of Figure 10

In Figure 10, the fifth wheel is denoted 64, and is connected by a link 65 to an angle lever 66, and the angle lever has its lateral arm attached by a link 67 to a toggle lever 68. One end of the toggle lever 68 is attached to a bracket 69 and the other end is attached to the support 70, so that by the mere rocking of the fifth wheel 64, incident to the coupling thereof with the tractor fifth wheel, the support 70, will be carried upwardly to the dotted line position of Figure 10, and become inoperative. The fifth wheel 64 may have latch means similar to those previously described, as for instance, the trip latch lever 71 engageable with a latch member 72 on the trailer frame to hold the fifth wheel in the position of Figure 10, until the tractor fifth wheel engages the lever 71, and unlocks the fifth wheel for its rocking movement to horizontal position. The spring 73 connects with the lever arm 71—A of the fifth wheel 64, and normally tends to carry the support 70 to its lowermost operating position.

Summary

Having in view the state of the prior art, I consider it to be broadly new to impart actuation to brakes of a trailer incident to pivotal movement alone of a fifth wheel on such trailer. Additionally, it is believed broadly new to impart movement to a support for the front of the trailer, which support is mounted thereon, independently of the fifth wheel of such trailer, by means of movement of the said fifth wheel.

The trailer fifth wheel and supporting construction provided herein, according to certain modifications of the present invention, may be of conventional pivoted type such as illustrated in Figure 10, and thus adapted by means of the connections described, or equivalent connections, to cooperate with brakes or supports, in the manner presented as an objective hereof. The locking controls for the fifth wheel of the trailer as combined in the constructions described, afford novel cooperative actions of merit from the viewpoint of simplifying constructions heretofore employed.

Having thus described my invention, what I claim as new and desire to secure by Letters Patent of the United States, is:—

1. In combination, a trailer, a support for the front end of the trailer pivoted thereto at a fixed point, a fifth wheel including draft coupling means for the trailer pivoted thereto permitting movement of the fifth wheel in a vertical plane only, and connections between the support and fifth wheel such that by pivotal movement of the fifth wheel in one direction the support will be raised and by pivotal movement of the said fifth wheel in another direction the support will be lowered.

2. In combination, a trailer, a fifth wheel pivoted to the trailer for rocking movement, wheels supporting the trailer at its rear end, brake mechanism for said wheels, and parts connecting the fifth wheel with said brake mechanism to apply and release the brake mechanism by rocking movement of the fifth wheel.

3. In combination, a trailer, a fifth wheel pivoted to the trailer and normally inclined when a tractor is not coupled to the trailer, a support for the front end of the trailer, brake mechanism for the supporting wheels of the trailer, and parts for actuating said support and said brake mechanism connected to the fifth wheel and operated by pivotal movement of the fifth wheel, and lock mechanism on the fifth wheel for locking same in such a position that the support is operative.

4. In combination, a trailer, a fifth wheel pivoted to the trailer and normally inclined when a tractor is not coupled to the trailer, a support for the front end of the trailer, brake mechanism for the supporting wheels of the trailer, parts for actuating said support and said brake mechanism connected to the fifth wheel and operated by pivotal movement of the fifth wheel, lock mechanism on the fifth wheel for locking same in such a position that the support is operative, and a trip member on the fifth wheel for releasing said locking mechanism and so disposed as to be operable by a fifth wheel upon a tractor.

5. In combination, a trailer, a fifth wheel pivoted to the front end of the trailer, a support pivoted to the trailer, connections between the support and the fifth wheel for moving the support up and down incident to certain movements of the fifth wheel, lock mechanism on the fifth wheel to lock the said fifth wheel and trailer with the support in a lowered position, and a trip device on the fifth wheel for releasing said lock mechanism and arranged to be operated by means upon a tractor, together with a tractor having means thereon for operation of said trip mechanism.

6. In combination, a trailer, a fifth wheel movably mounted on the trailer, a lock device on the fifth wheel, a locking part on the trailer engageable by the locking device on the fifth wheel to hold the fifth wheel in operating traveling position, automatic actuating means on the fifth wheel for releasing said lock device of the fifth wheel, a tractor and a fifth wheel on the tractor cooperating with said lock device of the trailer fifth wheel for rendering the automatic releasing means effective on uncoupling the tractor fifth wheel from the trailer fifth wheel.

7. In combination, a trailer, a fifth wheel movably mounted on the trailer, a lock device on the fifth wheel, a locking part on the trailer engageable by the locking device on the fifth wheel to hold the fifth wheel in operating traveling position, automatic actuating means on the fifth wheel for releasing said lock device of the fifth wheel, a tractor and a fifth wheel on the tractor cooperating with said lock device of the trailer fifth wheel for rendering the automatic releasing means effective on uncoupling the tractor fifth wheel from the trailer fifth wheel, a support movably mounted on the trailer and connections between the fifth wheel and said support for actuating the same dependent upon the controlling action of the lock device of the fifth wheel of the trailer.

8. In combination, a trailer, a fifth wheel pivoted to the trailer, a support for the front end of the trailer connected with said fifth wheel, and ratchet mechanism intermediate the fifth wheel and the trailer for holding the fifth wheel and said support in a predetermined angular position.

9. In combination, a trailer, a fifth wheel pivoted to the trailer, a support for the front end of the trailer connected with said fifth wheel, ratchet mechanism intermediate the fifth wheel and the trailer for holding the fifth wheel and said support in a predetermined position, said ratchet mechanism comprising a ratchet part carried by the trailer, and a latch cooperating therewith and carried by the fifth wheel.

10. In combination, a trailer, a fifth wheel pivoted to the trailer, a support for the front end of the trailer connected with said fifth wheel, ratchet mechanism intermediate the fifth wheel and the trailer for holding the fifth wheel and said support in a predetermined position, said ratchet mechanism comprising a ratchet part carried by the trailer, and a latch cooperating therewith and carried by the fifth wheel, a lock device on the fifth wheel for connecting the fifth wheel rigidly with the trailer, the last mentioned latch being connected with the lock device on the fifth wheel so as to be tripped incident to cooperation of the tractor fifth wheel with the trailer fifth wheel.

11. In combination, a trailer, a fifth wheel pivotally mounted thereon, a lever device connected with the said fifth wheel and movable thereby, a support pivoted to the trailer, and connections between said lever device and said support for actuation of the support by pivotal movement of the said fifth wheel.

12. In combination, a trailer, a fifth wheel pivoted to the trailer, a king pin for said fifth wheel, a lever device rigid with and movable by said fifth wheel on pivotal movement of the latter, a support pivoted to the trailer, and connecting means between the lever device and said support such that on pivotal movement of the fifth wheel similar movement is imparted to the support.

13. In combination, a trailer, a fifth wheel pivoted to the trailer, a king pin for said fifth wheel, a lever device rigid with and movable by said fifth wheel on movement of the latter, a support pivoted to the trailer, connecting means between the lever device and said support so that on pivotal movement of the fifth wheel similar movement is imparted to the support, latch mechanism carried by the fifth wheel for locking said fifth wheel and support in a predetermined position, and a tractor fifth wheel adapted to cooperate with the trailer fifth wheel and to actuate said latch mechanism substantially as set forth.

14. In combination, a trailer, a fifth wheel mounted on the trailer, spring means for moving said fifth wheel into a normally inclined position relative to the base of the trailer, a tractor, a tractor fifth wheel cooperative with the trailer fifth wheel and adapted to move the trailer fifth wheel into a substantially horizontal position relative to the trailer, and latch means intermediate the trailer and the trailer fifth wheel for holding the trailer fifth wheel in said horizontal position.

15. In combination, a trailer, a fifth wheel mounted on the trailer, spring means for moving said fifth wheel into a normally inclined position relative to the base of the trailer, a tractor, a tractor fifth wheel cooperative with the trailer fifth wheel and adapted to move the trailer fifth wheel into a substantially horizontal position relative to the trailer, and latch means intermediate the trailer and the trailer fifth wheel for holding the trailer fifth wheel in said horizontal position, said latch means including a trip device operable by the tractor fifth wheel to release the latch mechanism.

16. In combination, a trailer, a fifth wheel mounted on the trailer and movable from inclined position when the trailer is uncoupled from the tractor to a horizontal position when the trailer is coupled to a tractor, automatically operating lock mechanism on the fifth wheel cooperative with the trailer to hold the said fifth wheel in a horizontal position, trip mechanism on the fifth wheel operable by a tractor fifth wheel to release said lock mechanism, and a support carried by the trailer independently of the fifth wheel and connected to be moved incident to movement of the fifth wheel.

JOHN F. ROBB.